UNITED STATES PATENT OFFICE.

JOHN C. PENNINGTON, OF PATERSON, NEW JERSEY.

IMPROVEMENT IN PROCESSES FOR OBTAINING PURE YEAST AND PRODUCING SPECIFIC FERMENTATION.

Specification forming part of Letters Patent No. 215,287, dated May 13, 1879; application filed October 2, 1878.

*To all whom it may concern:*

Be it known that I, JOHN C. PENNINGTON, of the city of Paterson, in the county of Passaic and State of New Jersey, have invented certain new and useful Improvements in Brewing and Fermenting, being a process for producing pure beer and wine yeast and other ferments; and I do hereby declare that the following is a full, clear, and exact description of the invention, which will enable others skilled in the art to which it appertains to make and use the same.

It is well known that ordinary wine and beer yeasts contain many different organisms, distinguishable under the microscope, some of which are beneficial, while others are injurious, to the liquor. A description of these organisms may be found in the works of Pasteur, Schutzenberger, Colin, and others.

It is sufficient here to state that by the general process hereinafter described I can isolate any of these organisms, though I will describe more particularly the isolation of the true beer and wine yeasts, the general appearances of which, under a power of four hundred diameters, are, respectively, that of an ellipsoid, having a number of rather remarkable spots, and that of an egg-shaped body, generally with a bud at the small end, and without spots.

To carry my process into effect I fill one or more small vessels, flasks, or test-tubes with beer-wort or fruit-juice, and close the same with plugs of cotton-wool to exclude the dust of the air, with all spores and germs contained therein.

The vessel having been filled and closed, as described, the contained liquid is freed from all ferments or their germs by heating to the boiling-point two or three times, at intervals of about twelve hours. I next prepare some flat tubes, of a diameter of one one-thousandth inch, or less, by heating thin glass tubing of, say, one-eighth inch diameter, flattening it, and quickly drawing it out. The object of flattening the tubes will appear farther on. Next I dip one of these tubes into beer-wort or fruit-juice in a state of full natural fermentation, when the tube will fill itself by capillary attraction. I then place the tube upon the stage of a microscope which magnifies three hundred to six hundred diameters, and examine the contained liquid.

Certain difficulties present themselves in the examination of liquids contained in ordinary round capillary tubes. These difficulties arise from the fact that the light is reflected variously from the rounded surface of the tube, and therefore the whole contents of the tube within the field of vision cannot be seen at one focus. It is also generally impossible to see through the liquid. Now, by making the tube flat these difficulties are overcome, and I have discovered that while contact with the atmosphere is practically avoided, the whole of the liquid within the field of vision can be seen at one focus, the observer being enabled to view it at once in its entire length, breadth, and depth.

If the microscope shows that the liquid contains one or more globules of the desired kind, and no others, I introduce the tube through the cotton plug into one of the above-described vessels, and, breaking the tube off at any desired point, allow the broken portion to fall into the liquid.

Successive undesirable portions of the tube may be broken off while it is on the stage of the microscope.

As the globules contained in the capillary tube will at once begin to bud and increase, in a few days the contents of the vessel into which the tube is dropped will be in full fermentation. A drop of this liquid is now to be examined under the microscope, and if no ferment organisms other than those that are wanted are present, the contents of the vessel are introduced into a larger quantity of beer-wort or wine-must, free from ferments, by means of a pipette pushed through the plug of cotton-wool. The globules will now increase and multiply until a sufficient quantity of yeast is produced, and this yeast is then available in greater or smaller quantities for producing a pure fermentation.

If the microscope shows the small tube to contain ferment-globules other than those that are desired, the tube must be rejected, and another filled and examined, so proceeding until one is found free from all ferments other than those that are desired.

To facilitate obtaining a tubeful of liquid which shall contain the requisite ferments only, I take advantage of the fact developed by experience that some of the undesirable globules and substances are heavier and others are lighter than the desirable kinds, and therefore I proceed about as follows: Having filled a vessel with fermenting liquid, I dilute this liquid freely with pure water, and allow the mixture to stand a short time until the heavier impurities have settled. The lighter impurities and the desirable globules or true yeast first above referred to remain suspended in the liquid. Then I decant the supernatant liquid and allow it to stand several hours, or until the desirable globules have sunk to the bottom, and are available for use upon decanting the liquid containing the lighter impurities.

The operation of separating the heavier and lighter impurities from the true yeast may be repeated as often as desirable. The capillary tube may also be filled from a vessel in which a more or less pure fermentation has been started, as above described. It will then be easier to obtain a tube of pure yeast, on account of the comparatively greater purity of the ferment previously so produced.

In conclusion, it will be seen that the effect of this process is to get a very minute portion of any liquid containing ferment-globules inclosed in glass walls, so that it can be completely and thoroughly examined under high powers of the microscope, and then transferred to a fermentable liquid without contamination of dust from the air, thus obtaining what may be called "pedigree yeast," free from any other, and perhaps objectionable, ferments.

It is desirable to carry on the operations described in a room as free from dust as possible.

Having thus fully described my invention, what I claim, and desire to secure by Letters Patent, is—

1. The process of obtaining and isolating globules or microbes (microscopic living organisms) from a liquid containing them, and multiplying them to produce specific fermentations, which process consists in filling a flattened capillary glass tube with a liquid containing microbes, viewing the same microscopically to ascertain that the tube contains such microbes only as are desired, or to ascertain what part of the tube contains such microbes only as are desired, and then transferring that part of the tube containing the desired microbes into a fermentable liquid free from previously-existing ferments, where the desired microbes can multiply and increase, all as described.

2. The method of preparation of a minute portion of a liquid for microscopic examination, whereby excessive reflection and refraction of light are avoided, and the whole of the liquid within the field may be seen under one focus, while contact with the atmosphere is practically avoided, which method consists of inclosing the said liquid in a flattened capillary glass tube, as set forth.

3. As an article of manufacture, a flattened capillary glass tube for microscopic examinations, substantially as set forth.

In testimony that I claim the foregoing as my own I affix my signature in presence of two witnesses.

JOHN C. PENNINGTON.

Witnesses:
WILLIAM PENNINGTON,
WILLIAM H. BLAUVELT.